United States Patent
Entenmann

(10) Patent No.: US 6,957,142 B2
(45) Date of Patent: Oct. 18, 2005

(54) METHOD AND DEVICE FOR EVALUATING A DRIVING STYLE

(75) Inventor: Volker Entenmann, Affalterbach (DE)

(73) Assignee: DaimlerChrysler AG, Stuttgart (DE)

( * ) Notice: Subject to any disclaimer, the term of this patent is extended or adjusted under 35 U.S.C. 154(b) by 104 days.

(21) Appl. No.: 10/181,197

(22) PCT Filed: Dec. 16, 2000

(86) PCT No.: PCT/EP00/12844

§ 371 (c)(1),
(2), (4) Date: Jun. 9, 2003

(87) PCT Pub. No.: WO01/51891

PCT Pub. Date: Jul. 19, 2001

(65) Prior Publication Data

US 2004/0030458 A1 Feb. 12, 2004

(30) Foreign Application Priority Data

Jan. 14, 2000 (DE) .......................................... 100 01 261

(51) Int. Cl.⁷ .............................................. G01C 21/34
(52) U.S. Cl. ........................................ 701/117; 706/11
(58) Field of Search ............................ 701/36, 40, 44, 701/57–59, 98, 117–124; 706/2, 4, 8–9, 11

(56) References Cited

U.S. PATENT DOCUMENTS

| 4,058,796 A | 11/1977 | Oishi et al. |
| 5,146,219 A | 9/1992 | Zechnall |
| 5,177,685 A | 1/1993 | Davis et al. |
| 5,270,708 A | 12/1993 | Kamishima |
| 5,327,117 A | * 7/1994 | Kohsaka ..................... 340/525 |
| 5,410,304 A | 4/1995 | Hahn et al. |
| 5,483,446 A | * 1/1996 | Momose et al. ............... 701/1 |
| 5,757,949 A | 5/1998 | Kinoshita et al. |
| 6,667,726 B1 | * 12/2003 | Damiani et al. ............. 345/1.1 |

FOREIGN PATENT DOCUMENTS

| DE | 3700552 | 7/1988 |
| DE | 4338073 | 5/1995 |
| DE | 19630970 | 2/1997 |
| EP | 0049522 | 3/1986 |
| EP | 0745965 | 12/1996 |
| EP | 0819912 | 1/1998 |
| EP | 0487280 | 4/1998 |
| JP | 09-257507 | * 10/1997 | ........... G01C/21/00 |
| WO | 92/03802 | 3/1992 |

* cited by examiner

Primary Examiner—Thu V. Nguyen
(74) Attorney, Agent, or Firm—Crowell & Moring LLP

(57) ABSTRACT

The invention relates to a method and to a device for evaluating driver performance, comprising the continuous detection of the actual state of travel and the actual traffic situation and determining a reference state of travel pertaining to the actual traffic situation. Said reference state of travel is the state of travel desired in the respective traffic situation according to a predetermined evaluation criterion. According to the invention, the actual state of travel detected is evaluated according to said evaluation criterion by comparing it with the pertaining detected reference state of travel. Subsequently, one or more pieces of feedback information regarding driver performance during a preceding traffic situation are given. The invention also refers to the use of the inventive device for the instructive evaluation of the driver performance of road vehicle users.

10 Claims, 1 Drawing Sheet

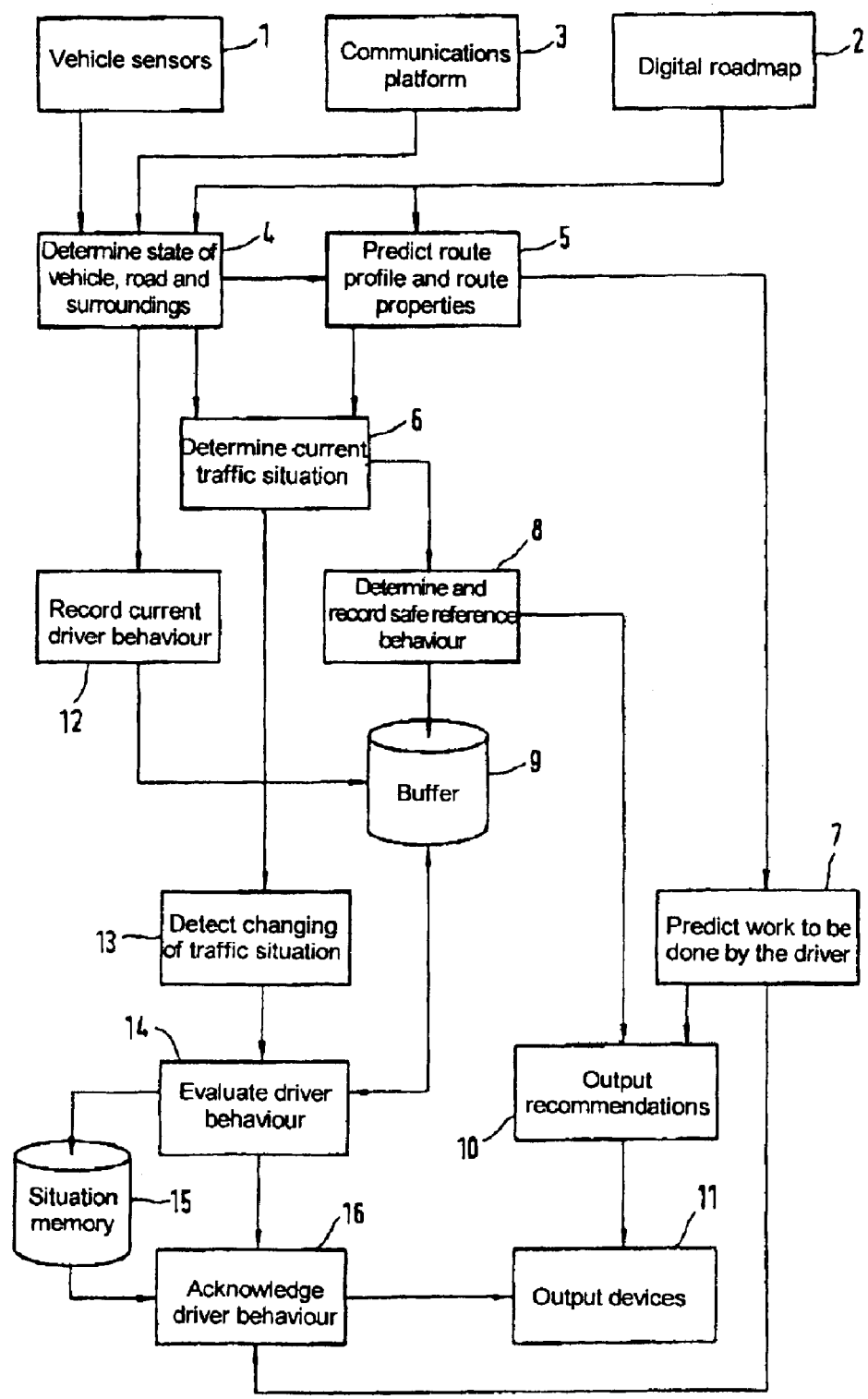

METHOD AND DEVICE FOR EVALUATING A DRIVING STYLE

BACKGROUND AND SUMMARY OF THE INVENTION

The invention relates to a method and a device for evaluating the driving style of a driver of a vehicle when travelling on a network of traffic routes, for example a road network, with a corresponding vehicle such as a road vehicle.

Particularly in road traffic, the continuously increasing volume of traffic is making it difficult to achieve the highest possible level of traffic safety. In this context, modern traffic telematics are becoming increasingly significant. With the telematics, the situation or context in which a vehicle is moving, i.e. both its driving state and the traffic situation in which it finds itself at a particular time, can be detected automatically in increasingly better ways by using vehicle-mounted digital roadmaps in which, in addition to the precise geometry of the route network, safety-related attributes such as pedestrian crossings, road signs, etc. can also be stored, and by using highly precise locating of vehicles and extensive vehicle-mounted sensor systems.

Such detection of driving states and traffic situations is used, for example, to detect the driving style of the driver of the vehicle in order to classify it in a predefined way, such as into a sporty, steady or economic driving style, etc, and adapt it as a function thereof, for example transmission shift characteristic curves, or carry out adjustment of the chassis or warn the driver of the vehicle of a current hazardous situation or directly imminent hazardous situation or against driving limiting values being exceeded in a way which endangers driving safety.

WO 92/03803 A1 describes a method and a device for evaluating a driving style, in which a desirable driving state is determined as a function of the driver behavior and driving state parameters, the driving behavior of the driver is evaluated and this evaluation is output to the driver.

Such warning systems are customary in a wide range of embodiments. In one type of such systems, the profile of the road is determined predictively in particular with respect to bend geometries and intersection geometries and/or the presence of possible obstacles on the route in order to warn the driver of the vehicle against approaching the corresponding hazardous point too quickly, which would endanger safety. The determination of hazardous points in advance can be based here on a digital roadmap, see the Laid-open Application EP 0 819 912 A2, and the Patent EP 0 487 280 B1, or on an image-recording and image-processing system which registers the front area of the vehicle, see U.S. Pat. No. 5,757,949.

A further type of conventional system uses a digital roadmap which is expanded with an additional database. The database contains traffic-safety-related information, for example statistical accident data from which information about accident blackspots is generated and, for example, output in the form of a voice message (as described in U.S. Pat. No. 5,270,708) or safety zones, such as residential areas, schools, etc. in which the drive power of the vehicle, and thus the possible speed, is automatically limited, as disclosed in the Laid-open Application EP 0 745 965 A1. Or, safety-related information is provided, for example in the form of road signs, which is output visually and/or audibly as soon as the vehicle approaches the respective location, as disclosed in U.S. Pat. No. 5,146,219.

A further type of conventional warning system provides for the distance from the vehicle travelling ahead to be determined and the driver then to be warned if the distance drops below a predefinable value, see U.S. Pat. No. 5,410,304.

Furthermore, systems which warn against falling asleep and which sense the movement of the vehicle or the profile of the steering angle and draw conclusions from these as to the state of the driver in particular with respect to his degree of tiredness, are known, see European Patent document EP 0 049 522 B1 and the German Laid-open Application DE 196 30 970 A1.

A general problem of warning systems which warn the driving against imminent hazardous situations is that the gain in safety which can possibly be achieved by them is possibly cancelled out again by the driver through a correspondingly risky driving style as the driver can be tempted to trust the warning system and try to find out the triggering limit of the warning system by more risky driving maneuvers than he would make without a warning system, for example to drive through a bend so quickly that a bend warning system which is present responds. The driver is therefore not particularly stimulated by such pre-warning systems to subject his driving behavior, under his own volition, to specific criteria such as more safe driving with sufficient distance from the limiting range of the vehicle movement dynamics and/or to drive in a way which is favorable in terms of fuel consumption.

The technical problem on which the invention is based is to provide a method and a device for evaluating a driving style which can stimulate a driver of a vehicle to select his driving style, i.e. his driving behavior, at his own volition in such a way that it fulfils predefinable desired criteria, for example with respect to driving in a way which is safe for traffic and/or favorable in terms of fuel consumption.

The invention solves this problem by providing a method and a device for evaluating a driving style in which: (a) the current driving state is continuously sensed by reference to associated driving state parameters, and the current traffic situation is continuously sensed by reference to associated traffic situation parameters, (b) an associated reference driving state which, in the respective traffic situation, represents a driving state which is desirable with respect to a predefinable evaluation criterion, is determined in relation to the respectively sensed current traffic situation, by using a predefinable traffic situation reference driving state relation, and (c) the sensed current driving state being evaluated by comparison with the respectively determined reference driving state in accordance with the evaluation criterion, and one or more corresponding acknowledgement information items relating to the driving style during a respective preceding traffic situation being retrospectively output, wherein at least two groups of acknowledgement information items which are associated with two different values of a predefinable category parameter are predefined as driving style acknowledgement information items which can be output, and an acknowledgement generation criterion is predefined that the amount of acknowledgement information items of the one group which are output during a journey remains larger than the amount of acknowledgement information items of the other group which are output or the amount of acknowledgement information items of the one group which are output has a predefinable relationship with that of the other group.

This method and this device characteristically provide for acknowledgement information relating to the driving style during a preceding traffic situation to be output retrospectively, in particular also as information for the driver of the vehicle relating to how his driving behavior during the preceding traffic situation is to be evaluated in accordance with a predefined evaluation criterion. As evaluation criterion, it is possible in particular to predefine whether, or to what extent, the driving behavior corresponds under the given conditions to a safe driving style which does not endanger traffic, which includes, in addition to other criteria, a sufficient distance from the limiting range of the vehicle movement dynamics. Alternatively, or in addition, other evaluation criteria are possible, for example a driving behavior with the lowest possible fuel consumption.

In order to be able to generate such acknowledgement information, the current driving state and the current traffic situation are continually sensed, a driving state which fits the current traffic situation, i.e. one that is desirable, in accordance with the predefined evaluation criterion is derived as a reference driving state and the current driving state is evaluated by comparing it with the determined reference driving state in accordance with the evaluation criterion. In other words, it is determined whether, and to what extent, the driving state corresponds to the reference driving state or how far it departs from it using the evaluation criterion as a measure of distance. The reference driving state is not necessarily to be understood here in the context of every possible driving state as only a punctual state but rather designates in general an entire range of driving states which, in the respective traffic situation under the predefined evaluation criterion, represent possible setpoint driving states which all fulfil the evaluation criterion equally well. Thus, under the evaluation criterion of a driving behavior which is safe in terms of traffic, the reference driving state can cover all the driving states which may be classified as safe in the respective traffic situation, for example have a sufficient distance from the limiting range of the vehicle movement dynamics.

The acknowledgement information provided by the invention which relates to the driving behavior retrospectively, i.e. relates to the respectively preceding driving behavior, has the fundamental advantage over conventional warning systems which warn of a possible hazardous traffic situation in advance, that they can form an independent motivation for the driver of the vehicle to orient his driving behavior according to the predefined evaluation criterion, for example to select a safe and considerate driving style. As a result of suitable configuration and selection of the acknowledgement information which is output, it is possible for a correct driving behavior which is desirable in terms of the evaluation criterion to be taught by the system, and thus learned by the driver of the vehicle by virtue of the fact that the information is configured or selected in such a way that if the current driving behavior corresponds essentially to the reference driving behavior, then the information positively reinforces the behavior in a targeted fashion. As a result, in most cases it is possible to achieve a relatively larger and longer-lasting change in the driving behavior than is possible through compulsory measures which act negatively, for example threats of punishment or confiscation of a driver's license for a certain time, something which is confirmed by corresponding findings from educational psychology.

The method according to the invention and the device according to the invention contain at least two groups of acknowledgement information items of different categories. The outputting of the acknowledgement information items is configured in such a way that the amount, i.e. the number and/or intensity, of acknowledgement information items of the one group which are output, i.e. of the one category, for the respective evaluation time period which can comprise the entire respective journey or part of a respective journey, of one or more traffic situations which have been coped with, is kept larger than the amount of acknowledgement information items of the other group, or is kept in a predefinable relationship with the amount for the other group. For example, in this configuration of the invention, positive, "praising" acknowledgements on the one hand and negative "rebuking" acknowledgements on the other may be provided, the amount of positive acknowledgements preferably always outweighing the amount of negative acknowledgements even when the overall nature of the driving behavior is less positive, and the amount of negative acknowledgements can, if necessary, be reduced to zero, i.e. there are then only positive acknowledgements. As a result, an overall positive acknowledgement impression for the driver can be produced so that the acknowledgements do not spoil his pleasure in driving, but rather motivate him selectively to adopt the desired, for example safe driving behavior, and encourages him to define his competence as a driver by safe driving behavior, and not risky driving behavior.

In a method and device which is developed according to a preferred embodiment of the invention, the outputting of driving style recommendations is provided, by reference to which recommendations the driver of the vehicle can orient his driving behavior in such a way that it corresponds to the reference driving state which is determined for the respective traffic situation. The driving style recommendations are preferably selected here in such a way that there is a sufficient driving behavior margin, in terms of the evaluation criterion of a high level of traffic safety, for example the recommended driving style has a sufficient safety margin with respect to the limiting range of the vehicle movement dynamics.

A method and device which is developed according to another preferred embodiment of the invention take into account the expected loading on the driver in the directly imminent traffic situation, i.e. for the driver travelling along the route directly ahead in the outputting of information for the acknowledgements and the driving style recommendations, if they are provided, the state of the route being estimated in advance for this purpose and in order to sense the current traffic situation. The information is then output only in time periods in which the driver is not too heavily loaded with the imminent driving tasks so that he can pay sufficient attention to the information items which are output.

One advantageous embodiment of the invention is illustrated in the drawing and will be described below.

BRIEF DESCRIPTION OF THE DRAWING

The single FIGURE shows a block diagram of a method and a device for evaluating a driving style with evaluating driving style acknowledgement information items.

DETAILED DESCRIPTION OF THE DRAWING

The FIGURE is a block diagram of a device for evaluating a driving style (having the components of interest here), showing the functional interaction of the components. At the same time, the figure constitutes a flowchart showing the sequence of the driving style evaluation method which is carried out by this device if the individual blocks of the block diagram are not considered as system components in this respect, but rather as method steps which are carried out by the respective system components. For this reason, the individual system components and the functions carried out by them will be explained below in parallel.

A sensor block 1 comprises the sensor system which is necessary for sensing the position and the movement state of the vehicle. In order to implement such a sensor system, the person skilled in the art can make use of conventional sensor systems in order to fulfill this purpose, which requires no further explanation here. The sensor system 1 can optionally comprise sensor elements for sensing the state of operator controls which are actuated by the driver, the state of the route network, i.e. the state of the road in the case of road vehicles, the visibility and the entire context of the vehicle in terms of traffic.

The profile of the route, the category of the route, for example motorway, country road or road within a built-up area, and the number of traffic lanes, as well as preferably further safety-related attributes such as pedestrian crossings, priority regulations and speed limits, are stored in a digital roadmap 2 of a customary type.

The vehicle's own system can communicate with other vehicles, with a traffic information control center and/or with other communications infrastructure components, by using an optional communications platform 3 of a customary design.

The current state of the vehicle, road and surroundings are determined in a state-determining unit 4. Specifically, the state-determining unit 4 calculates the current position and the movement state of the vehicle from the data which is called for that purpose from the respective sensors of the sensor block 1 and from the digital roadmap 2. When there is additional use of data transferred via the communications platform 3 and of data from the above-mentioned optional sensor elements, it is possible, when necessary, to determine the state of the vehicle, road and surroundings with improved precision, for example the coefficient of friction of the surface of the road, the visibility, the distance from the vehicle travelling ahead and/or information can also be included in the determination of the state.

A route prediction unit 5 is used to estimate in advance the future profile of the route and the future properties of the route for a predefinable prediction time period by using the current position of the vehicle determined by the state-determining unit 4 and by using the data of the digital roadmap 2. The prediction of the future profile of the route comprises, in particular, the qualitative and quantitative estimation in advance of imminent bends. Future properties of the route are, for example, imminent speed limits and intersections with respective priority regulations.

The route preview data generated by the route prediction unit 5 are used, in a driver-loading prediction unit 7, to estimate in advance the expected loading, i.e. work demanded of the driver of the vehicle, involved in carrying out the imminent driving task, and to determine those time windows in which the predicted work demanded of the driver is below a predefinable threshold so that the time windows are therefore particularly suitable for the outputting of information to the driver.

A traffic situation-determining unit 6 determines the current traffic situation by reference to the route preview data of the route prediction unit 5 and by reference to the state data supplied by the state-determining unit 4. In this way, the traffic situation-determining unit 6 can, for example, detect automatically when the vehicle is approaching a traffic light-controlled intersection in thick fog as such a traffic situation. The same applies to all other traffic situations which typically occur in traffic. The means and algorithms which are necessary for this are known to the person skilled in the prior art and therefore need no further description here.

For the current traffic situation which is determined by using the traffic situation-determining unit 6, a reference-determining unit 8 determines an associated reference driving state which is adapted to the traffic situation. The process comprises the determination of adapted values for the vehicle speed, the positive or negative vehicle acceleration, the longitudinal distance from a vehicle travelling ahead, the possible activation of an indicator light, etc. This reference driving state, also referred to below as reference driving behavior, is selected in such a way that in the given traffic situation it satisfies a predefined evaluation criterion, for example the criterion of safe driving behavior in order to achieve a high level of traffic safety. In this context, the reference driving state may not only designate a punctual state but also an entire range of the state space of possible driving states. It is selected in such a way that it guarantees sufficient margins, i.e. sufficient safety margins in the case of the criterion of a high level of traffic safety, so that relatively small deviations from this reference driving behavior still do not lead to a driving state which is undesired, for example critical in terms of safety. The reference driving state which is determined in this way is stored, on the one hand, in a buffer 9, which can be deleted again after the end of the evaluation operation. On the other hand, the reference driving state data is used by a recommendation-generating unit 10 to generate driving recommendations corresponding to the determined reference driving state and to supply them to an output unit 11. The latter comprises one or more output devices with which the information items which are input can be conveyed to the driver in a perceptible fashion, for example visually, haptically and/or audibly. For example, such a driving recommendation can contain the information that a specific maximum cornering speed is recommended to travel through an imminent bend. As the name suggests, the emphasis is on the recommendation aspect of this information and not for example on its warning aspect.

In parallel with the determination of the respective reference driving state by the reference-determining unit 8, a driving state-determining unit 12 continuously determines the current driving state, i.e. the current driving behavior, also referred to as driver behavior, by reference to the necessary input data which is supplied to it for this purpose by the state-determining unit 4. In this context, the current driving behavior which is determined by the driving state-determining unit 12 is described by the same driving state parameters as the reference driving behavior determined by the reference-determining unit 8. The current-driving state data which is generated in this way by the driving state-determining unit 12 is also stored in the buffer 9.

The data which relates to the current traffic situation and which is generated by the traffic situation-determining unit 6 is used, by a situation change-detection unit 13, to detect a change in the current traffic situation, i.e. the entirety of all the possible traffic situations which occur are discretized into a finite number of different situations, and a transition from one of these discretized traffic situations to another is detected. If the situation change-detecting unit 13 detects such a change in the traffic situation, it reports this to a driving state-evaluation unit 14. This then evaluates the driving behavior in the traffic situation driven through last.

For this purpose, the driving state-evaluation unit 14 reads out the stored data relating to this in the buffer 9 and compares the actual recorded driving behavior with the reference behavior which was recorded in parallel. This evaluation is carried out according to driving style-evaluation criteria which the person skilled in the art is familiar with for this purpose. In the example of the evaluation criterion of a high level of traffic safety, the evaluation contains, for example, in particular the determination of whether the actual driving behavior was in the range which was noncritical in terms of the vehicle movement dynamics or else had reached the limiting range of the vehicle movement dynamics. The comparison result, i.e. the evaluated traffic situation, is stored in an associated evaluation data memory 15, also referred to as situation memory. Data which is no longer required in the buffer 9 can then be deleted.

The evaluation which is performed by the evaluation unit 14 includes here in particular a coarse distinction between whether the actual driving state has corresponded to the reference state at least to a certain degree, or whether it differs markedly from it, i.e. whether a driving behavior which is still tolerable overall or whether a driving behavior which is rather no longer tolerable, has occurred. Depending on requirements, finer gradation of the evaluation of the driving style may be provided. The evaluation result is supplied to an acknowledgement unit 16 and enables the acknowledgement unit 16 to generate different acknowledgements which can be roughly classified as positive, "praising" acknowledgements on the one hand and negative, "criticizing" acknowledgements on the other, in which case finer gradations are also possible here depending on requirements. The individual acknowledgements are preferably combined by the acknowledgement unit 16 in such a way that the amount of positive acknowledgements outweighs that of negative acknowledgements or is kept to a specific relation to the amount so that a desired overall positive impression of the acknowledgement information during a journey is produced, and maintained, for the driver. As a result, the readiness of the driver of the vehicle to behave in accordance with the evaluation criterion is reinforced in a targeted fashion.

The acknowledgement unit 16 generates the evaluating acknowledgements relating to the driving style in the preceding traffic situation or situations during a respective journey and/or after the end of the journey. To do this, it reads the data generated by the driving state-evaluation unit 14 and stored in the situation memory 15 out of said memory 15, subjects this data to a suitable statistical evaluation and, if appropriate, combines a plurality of individual acknowledgements to form an acknowledgement information item which is to be output. This is preferably carried out in such a way that at least one individual acknowledgement of the positive category is contained in each acknowledgement information item to be output, and/or the number or the strength of individual acknowledgements of the positive category is greater for each evaluated traffic situation or at least for relatively long evaluation time periods than that of the individual acknowledgement of the criticizing category, or is kept to a specific relation to them.

The acknowledgement unit 16 outputs the generated acknowledgement information items to the output unit 11 only in the time periods in which the work involved for the driver in carrying out the imminent driving task, as predicted by the driver-loading prediction unit 7, is not above the aforesaid threshold so that it is also actually possible for the driver of the vehicle to absorb the acknowledgement information. According to this secondary condition, the driving style-evaluating acknowledgement is either provided continuously by the acknowledgement unit 16, such as after every occurrence of an evaluated traffic situation with driving behavior which is assessed as being safe or critical, or is provided intermittently. Intermittent acknowledgements can be generated with suitable reinforcement, for example by a quota reinforcement, which makes the strength of acknowledgements dependent on the frequency of the occurrence of the associated driving style, or by means of a time interval reinforcement, which makes the strength of the acknowledgement dependent on the time which has passed since the last acknowledgement. With both types of acknowledgement, the outputting of the acknowledgements can take place at fixed time intervals, for example every 5 minutes, or at variable time intervals, for example once every 3 minutes and the other every 7 minutes. The output unit 11 conveys the acknowledgement information items in a suitable way, for example visually, audibly and/or haptically.

As the description above of an advantageous exemplary embodiment shows, the invention makes available a method and a device for evaluating a driving style, which are distinguished by driving style-evaluation acknowledgement information items which are output retrospectively and with which the driver of the vehicle can be motivated to adopt, by his own free will, a desirable driving behavior in a targeted fashion. The aspect of free will increases the degree of acceptance of the system.

If necessary, the driving-style evaluation in the form of acknowledgements can be expanded to the effect that there are direct personal advantages for the driver of the vehicle in the case of positive evaluation results. Thus, there may be provision that bonus points or credits are awarded for positive evaluation results and these are stored, for example on a chip card, so that the driver can cash them in, for example at the next customer service stop, in certain shops or at cultural events. Alternatively, or in addition, free units for a mobile telephone may be awarded for positive evaluation results, or contributions to vehicle insurance or rebates on said insurance may be made dependent on the acknowledged driving style-evaluation results.

In addition to the evaluation criterion, mentioned as having priority above, of achieving a high level of traffic safety, the invention is, of course, also suitable for alternative or additional evaluation criteria. In particular for professional drivers who do a large amount of driving, a useful evaluation criterion can be, for example, achieving a driving style with the lowest possible consumption, which is to be aimed for while taking into account economic and ecological aspects.

What is claimed is:

1. A method for evaluating a driving style, the method comprising the acts of:

continuously sensing a current driving state by reference to associated driving state parameters and continuously sensing a current traffic situation by reference to associated traffic situation parameters;

determining an associated reference driving state in relation to a respectively sensed current traffic situation using a predefinable traffic situation reference driving state relation, the associated reference driving state representing a desirable driving state in a respective traffic situation with respect to a predefinable evaluation criterion;

evaluating the sensed current driving state by comparison with the respectively associated reference driving state in accordance with the predefinable evaluation criterion;

outputting one or more acknowledgment information items relating to a driving style during a respective preceding traffic situation, wherein at least two groups of the acknowledgement information items associated with two different values of a predefinable category parameter are predefined as driving style acknowledgement information items available for output; and wherein an acknowledgment generation criterion is predefined such that an amount of acknowledgment information items of one of the two groups output during a journey remains larger than an amount of acknowledgment information items of another of the two groups which are output, or an amount of acknowledgment information items of the one group which are output has a predefinable relationship with that of the other group.

2. The method according to claim 1, further comprising the act of outputting driving style recommendations as a function of the reference driving state determined in relation to the current traffic situation.

3. The method according to claim 2, wherein the act of continuously sensing the current traffic situation comprises the act of using a route state prediction to sense the current traffic situation, the route state prediction being also used to estimate in advance an expected loading on the driver; and wherein the outputting of the acknowledgment information items or driving style recommendations occurs only in time periods in which the expected loading on the driver is below a predefinable threshold.

4. The method according to claim 1, wherein the act of continuously sensing the current traffic situation comprises the act of using a route state prediction to sense the current traffic situation, the route state prediction being also used to estimate in advance an expected loading on the driver; and wherein the act of outputting the acknowledgment information items only occurs in time periods in which the expected loading on the driver is below a predefinable threshold.

5. A device for evaluating a driving style, comprising:

means for continuously sensing a current driving state by reference to associated driving state parameters and a current traffic situation by reference to associated traffic situation parameters;

a reference determining unit for determining a reference driving state associated with the sensed current traffic situation, the reference driving state representing a desirable driving state in a respective traffic situation in accordance with a predefinable evaluation criterion;

a driving state-evaluation unit for evaluating the sensed current driving state by comparison with a respectively determined reference driving state in accordance with the evaluation criterion;

an acknowledgement unit for outputting one or more corresponding acknowledgment information items relating to a driving style during a preceding traffic situation;

wherein the driving state evaluation unit generates acknowledgements of at least two different categories and matches an output of acknowledgement information items such that an amount of the acknowledgement information items of one group output during a journey remains larger than an amount of acknowledgement information items of another group output in a corresponding time period.

6. A device according to claim 5, further comprising:

a recommendation generating unit for generating and outputting driving style recommendations as a function of the reference driving state respectively determined in relation to the current traffic situation.

7. A device according to claim 6, further comprising:

a route state prediction unit and a driver-loading prediction unit, the driver loading prediction unit using route state estimation data from the route state prediction unit for estimating in advance an expected loading on the driver for the current traffic situation; and wherein the acknowledgment unit and the recommendation-generating unit outputs the acknowledgment information items and the driving style recommendations only in time periods in which the expected loading on the driver is below a predefinable threshold, or the acknowledgment unit outputs the acknowledgment information items only in time periods in which the expected loading on the driver is below a predefinable threshold, or the recommendation-generating unit outputs the driving style recommendations only in time periods in which the expected loading on the driver is below a predefinable threshold.

8. A device according to claim 5, further comprising:

a route state prediction unit and a driver-loading prediction unit, the driver loading prediction unit using route state estimation data from the route state prediction unit for estimating in advance an expected loading on the driver for the current traffic situation; and wherein the acknowledgment unit outputs the acknowledgment information items only in time periods in which the expected loading on the driver is below a predefinable threshold.

9. A method of providing feedback on a driving style of a driver of a vehicle, the method comprising the acts of:

categorizing at least two groups of driving style acknowledgment information items, said two groups being associated with different values of a predefinable category parameter; and predefining an acknowledgment generation criterion such that an amount of driving style acknowledgment information items of one group output during a journey remains larger than an amount of driving style acknowledgment information items of another group output in a corresponding time period; and feeding back to the driver the driving style acknowledgment information items based on the predefined driving style acknowledgment generation criterion for a preceding traffic situation.

10. The method according to claim 9, further comprising the act of prohibiting feedback of the driving style acknowledgment information items during time periods in which an expected load on the driver is above a predefined threshold.

* * * * *